United States Patent
Gong et al.

(10) Patent No.: US 8,953,784 B2
(45) Date of Patent: Feb. 10, 2015

(54) LIGHTWEIGHT STREAM CIPHER CRYPTOSYSTEMS

(76) Inventors: Guang Gong, Waterloo (CA); Mark David Aagaard, Waterloo (CA); Xinxin Fan, Waterloo (CA)

(*) Notice: Subject to any disclaimer, the term of this patent is extended or adjusted under 35 U.S.C. 154(b) by 16 days.

(21) Appl. No.: 13/599,500

(22) Filed: Aug. 30, 2012

(65) Prior Publication Data
US 2013/0108039 A1 May 2, 2013

Related U.S. Application Data (60) Provisional application No. 61/554,957, filed on Nov. 2, 2011.

(51) Int. Cl.
*G06F 21/00* (2013.01)
*H04L 9/06* (2006.01)

(52) U.S. Cl.
CPC .......... *H04L 9/0662* (2013.01); *H04L 2209/805* (2013.01)
USPC .......................................................... 380/28

(58) Field of Classification Search
CPC ................................................... H04L 9/0668
USPC .......................................................... 380/28
See application file for complete search history.

(56) References Cited

U.S. PATENT DOCUMENTS

| | | | | |
|---|---|---|---|---|
| 6,078,745 | A * | 6/2000 | De Greef et al. | 717/151 |
| 6,578,129 | B1 * | 6/2003 | da Silva Jr. et al. | 711/209 |
| 6,684,330 | B1 * | 1/2004 | Wack et al. | 713/162 |
| 7,089,417 | B2 * | 8/2006 | Wack et al. | 713/162 |
| 7,146,050 | B2 * | 12/2006 | Lienhart et al. | 382/224 |
| 7,174,040 | B2 * | 2/2007 | Lienhart et al. | 382/155 |
| 2004/0013303 | A1 * | 1/2004 | Lienhart et al. | 382/224 |
| 2004/0015462 | A1 * | 1/2004 | Lienhart et al. | 706/45 |
| 2007/0263861 | A1 * | 11/2007 | Kiyomoto et al. | 380/46 |

OTHER PUBLICATIONS

Guang Gong et al, Cryptographic Properties of the Welch-Gong Transofmration Sequence Generators, Nov. 2002, IEEE, 2837-2846.*
C.H. Lam et al, Hardware Implementations of Multi-output Welch-Gong Ciphers, Mar. 2009, University of Waterloo, 1-16.*

* cited by examiner

*Primary Examiner* — Bradley Holder
(74) *Attorney, Agent, or Firm* — Miller Thomson LLP; Tai W. Nahm (57) ABSTRACT

There is disclosed an apparatus and method for generating a keystream with ideal two-level autocorrelation, which can be efficiently implemented in both software and hardware on mobile devices requiring high security protection and in resource limited smart devices such as RFID chips. In one embodiment, a 16-bit Welch-Gong (WG) transformation is used as the filtering function, which is applied to 16-bit input values generated from a linear feedback shift register. In another embodiment, an 8-bit WG transformation is used which is applied to 8-bit input values generated from a linear feedback shift register.

19 Claims, 10 Drawing Sheets

LIGHTWEIGHT STREAM CIPHER CRYPTOSYSTEMS

CROSS-REFERENCE TO RELATED APPLICATIONS

The present application claims priority from U.S. Patent Application No. 61/554,957, filed on Nov. 2, 2011, the entirety of which is incorporated herein by reference.

FIELD

The present disclosure relates to methods, systems and apparatus for generating keystreams with cryptographically strong properties. In an embodiment, the methods, systems and apparatus are adapted for use in mobile devices requiring high security protection, and in another embodiment, the methods, systems and apparatus are adapted for use in resource constrained embedded devices.

BACKGROUND

Fourth Generation (4G) cellular communications are presently being introduced to replace the current Third Generation (3G) technologies. Three major wireless communication systems can be generally classified into two categories: (1) IEEE 802.11 wireless link; and (2) 4G cellular systems which have competing candidates, namely LTE (Long Term Evolution) and WiMAX (i.e., IEEE 802.16m). Security is needed to ensure that the systems are properly functioning and to prevent misuse. In particular, encryption and authentication are crucial security mechanisms to guarantee user's privacy, as well as to block unauthorized use or access and protect revenue for mobile network operators.

Both IEEE 802.11 and WiMAX employ Advanced Encryption Standard (AES) in counter mode as a stream cipher for encryption, while LTE has two stream cipher candidates: Snow 3G and ZUC for the communication protection. However, when mobile devices become integrated platforms for various applications such as integrated sound, video, graphics or GPS data, the mobile devices become susceptible to critical physical layer attacks. Furthermore, the mobile devices become vulnerable to side-channel attacks which can be launched to hack the mobile devices. These types of attacks are independent of the security strength of the underline cryptographic algorithms.

Besides the potential for physical layer attacks, the confidentiality and integrity algorithms specified in the Third Generation Partnership Project (3GPP for short) are less efficient in terms of bandwidth efficiency, throughput and processing efficiency, storage, and power consumption, due to the complicated algorithm architecture. More importantly, the security of those cryptographic algorithms is difficult to analyze. Both stream ciphers Snow 3G and ZUC specified in 3GPP can only guarantee the period of the generated keystream. The aforementioned disadvantages may leave the doubt the security of Snow 3G and ZUC when used in 4G networks.

In a related field, with the advent of pervasive computing, various smart devices such as RFID tags, key fobs, and smart meters are becoming ubiquitous and impacting people's lives in significant ways. Their numerous applications range from access control and supply-chain management, to home automation and healthcare. Since a multitude of applications involve processing of sensitive personal information like health or biomedical data, the need for integrating cryptographic functions into embedded applications has risen significantly.

Unfortunately, these pervasive smart devices usually have extremely constrained resources in terms of computational capabilities, memory, and power supply. Hence, classical cryptographic primitives designed for full-fledged computers may not be suited for resource-constrained smart devices. Moreover, the tight cost constraints inherent in mass deployments of smart devices also bring forward impending requirements for designing new cryptographic primitives that can perform strong authentication and encryption, and provide other security functionalities for low-power applications.

A key issue of designing lightweight cryptographic algorithms is to deal with the trade-off among security, cost, and performance. When compared to asymmetric ciphers, symmetric ones are more preferable for smart devices with respect to the performance and power consumption. A host of lightweight symmetric ciphers that specifically target resource-constrained smart devices have been published in the past few years. These previous proposals can be roughly divided into the following three categories: (1) Highly optimized and compact hardware implementations for standardized block ciphers such as AES and IDEA; (2) Modifications of a classical block cipher like DES for lightweight applications; and (3) Low-cost designs, including lightweight block ciphers such as HIGHT, mCrypton, SEA, PRESENT and KATAN and KTANTAN, as well as lightweight stream ciphers such as Grain and Trivium.

While both stream ciphers Grain and Trivium can achieve relatively good performance in terms of hardware implementation, Grain can only guarantee a lower bound of periods of the generated keystreams, and Trivium does not possess any determined randomness properties by design. Those disadvantages leave doubt about the security of current stream ciphers such as Grain and Trivium, and limit their applications in practice. Moreover, both Grain and Trivium can be implemented relatively efficiently only in hardware, which may not be desirable for those embedded applications using low-power microcontrollers.

What is needed are improved methods, systems and apparatus for generating keystreams with cryptographically strong properties which address at least some of the limitations of the prior art.

SUMMARY

The present disclosure relates to methods, systems and apparatus for generating keystreams with cryptographically strong properties but maintaining or lowering cost and utilization of resources in comparison to prior art technologies.

Embodiments disclosed herein address the aforementioned issues by providing lightweight or ultra-lightweight stream ciphers referred to herein as WG-16 (Welch-Gong 16-bit transformation cipher) and WG-8 (Welch-Gong 8-bit transformation cipher), respectively, which have mathematically proved randomness properties and can be efficiently implemented in both software and hardware on mobile devices that require high security protection, and various resource-constrained smart devices that require strong protection at lower cost and resource utilization.

In an embodiment, there is provided a computer-implemented method for generating a cryptographic keystream on a device, comprising: i) loading a secret key and an initial vector (IV) into a linear feedback shift register (LFSR); ii) running the LFSR for an initial clock cycle with a nonlinear permutation feedback Welch-Gong n-bit (WG-n) transformation module as a filtering function; and iii) outputting a 1-bit keystream from the WG-n transformation module for each clock cycle after the initial clock cycle.

In an embodiment, n is selected from $2^k$, where k is an integer, such that a finite field (Galois-field) $GF(2^k)$ can be decomposed into an equivalent tower field $GF(((((2^2)^2)^2)\ldots)^2)$, thereby allowing a memory-optimized implementation of the WG-n transformation utilizing the equivalent tower field.

Generally speaking, the secret key is s-bits long, the initial vector is t-bits long, the LFSR is a u-stage LFSR, and the initial clock cycle is v clock cycles, where s, t, u and v are selected to match a required security level for a given application.

In another embodiment, there is provided an apparatus for generating a cryptographic keystream on a device, comprising: a linear feedback shift register (LFSR) for loading therein a secret key and an initial vector (IV); and a nonlinear permutation feedback Welch-Gong n-bit (WG-n) transformation module for running the LFSR for an initial clock cycle with a filtering function, and outputting a 1-bit keystream for each clock cycle after the initial clock cycle.

In another embodiment, synchronous stream ciphers WG-16 and WG-8 are lightweight or ultra-lightweight variants, respectively, of a WG stream cipher as submitted to an eSTREAM project. For WG-16, in an embodiment, the apparatus for generating a keystream consists of a 32-stage Linear Feedback Shift Register (LFSR) with each stage over a finite field—i.e. a Galois-field—$GF(2^{16})$ followed by a 16-bit Welch-Gong (WG) transformation module that acts as a filtering function. Similarly, for WG-8, a 20-stage Linear Feedback Shift Register (LFSR) with each stage over the finite field $GF(2^8)$ is followed by an 8-bit Welch-Gong (WG) transformation module that acts as a filtering function.

The 16-bit Welch-Gong (WG) transformation module can be further decomposed into two sub-modules, namely a 16-bit WG permutation (WGP-16) module and a 16-to-1 bit compression module. In an embodiment, both the secret key and the initial vector (IV) used in WG-16 are 128 bits. Similarly, the 8-bit Welch-Gong (WG) transformation module can be further decomposed into two sub-modules, namely an 8-bit WG permutation (WGP-8) module and an 8-to-1 bit compression module. In an embodiment, both the secret key and the initial vector (IV) used in WG-8 are 80 bits.

BRIEF DESCRIPTION OF THE DRAWINGS

The invention will be better understood and objects of the invention will become apparent when consideration is given to the following detailed description thereof. Such description makes reference to the annexed drawings wherein.

In the drawings, various embodiments of the invention are illustrated by way of example. It is to be understood that the description and drawings are only for the purpose of illustration and as an aid to understanding, and are not intended as a definition of the limits of the invention.

DETAILED DESCRIPTION

As noted above, the present disclosure relates to methods, systems and apparatus for generating keystreams with cryptographically strong properties.

In an embodiment, the methods, systems and apparatus are adapted for use in mobile devices requiring high security protection, and in another embodiment, the methods, systems and apparatus are adapted for use in resource constrained smart devices.

Generally speaking, the embodiments in this disclosure describe a lightweight or ultra-lightweight stream cipher for use in applications that require high security protection and/or have significant constraints on the amount of processing power, memory, and energy consumption for implementing the corresponding security mechanisms. Mobile phones and smart cards are examples of applications requiring high security, and while passive RFID tags are examples of smart devices having severe resource constraints.

For mobile phone applications and certain passive smart devices such as RFID tags, the security mechanisms are often implemented by application-specific integrated circuits (ASICs). On the other hand, other types of smart devices may implement security algorithms in software on low-power microcontrollers, or in hardware as cryptographic co-processors.

Hence, a lightweight stream cipher that can be efficiently implemented in both software and hardware on embedded or smart devices would be ideal. The present embodiments achieve this goal by employing an LFSR defined over a finite field $GF(2^{16})$, or in an alternative embodiment $GF(2^8)$, in combination with various efficient implementation techniques to significantly booth the performance of generating a keystream on embedded or smart devices.

In an embodiment, the operation of the stream cipher WG-16 generally comprises two steps: a) a Key/initial vector (IV) initialization step; and b) a keystream generation step. The Key/IV initialization step first loads a 128-bit secret key and a 128-bit IV into an LFSR of an apparatus or device, and the apparatus then runs for 64 clock cycles with a nonlinear permutation feedback WGP-16. After 64 clock cycles, the apparatus or device outputs a 1-bit keystream from the WG-16 transformation module for each clock cycle.

Significantly, a keystream generated from the stream cipher WG-16 has the following mathematically proved randomness properties:

The long period property. The period of the keystream is determined by the period of the LFSR, which is $2^{512}-1$.

The balance property. The number of 0s is only one less than the number of 1s in one period of the keystream.

First order resiliency property. With an appropriate chosen basis for $GF(2^{16})$, the Boolean function representing the keystream has 1-order resiliency.

Ideal two-level autocorrelation property. The generated keystream is an ideal two-level autocorrelation sequence. Assuming that N is the period of a sequence, the ideal two-level autocorrelation means that the autocorrelation value $C(t)=N$ (i.e., the maximum value) if t is a multiple of N or $C(t)=-1$ otherwise. For other sequences, the autocorrelation usually takes multiple values. In the mobile phone communication system, a base station first sends a pilot signal to a mobile device for synchronization, followed by the transmitted data. The mobile device periodically computes the autocorrelation. For an ideal two-level autocorrelation sequence, the autocorrelation value will reach the maximum value N after one period. For other time instant, the autocorrelation value is −1, a quite small number. Therefore, the ideal two-level autocorrelation sequences are very effective to combat with the channel noise. From the security point of view, an attacker also needs more power in order to jam the signal with this property, when compared to using other sequences. Moreover, applying certain decimations to the output keystream over $GF(2^{16})$ also gives ideal two-level autocorrelation sequences.

Linear complexity property. For certain decimation, the linear complexity of the keystream can be determined exactly, which is large enough to protect the smart devices from cryptanalysis in practice.

The keystream generated from the stream cipher WG-16 can be used to implement the following security mechanisms for mobile devices:

Provide the confidentiality of communications between two mobile devices by encrypting/decrypting messages using the generated keystream.

Provide the integrity of communications between two mobile devices by generating a message authentication code (MAC) using the generated keystream.

In an alternative embodiment, a keystream generated from the stream cipher WG-8 has analogous characteristics as described above for WG-16, but with the following differences:

| Transformation | WG-16 | WG-8 |
| --- | --- | --- |
| Secret key | 128-bit | 80-bit |
| Initialization clock cycles | 64 | 40 |
| LFSR Period | $2^{512}-1$ | $2^{160}-1$ |
| Chosen finite field | $GF(2^{16})$ | $GF(2^{8})$ |

The keystream generated from the stream cipher WG-8 can be used to implement the following security mechanisms for smart devices:

Provide the confidentiality of communications between smart devices by encrypting/decrypting messages using the generated keystream.

Provide the authenticity of communications between two smart devices by implementing a mutual authentication protocol using the generated keystream.

Provide the confidentiality and integrity of communications between smart devices by implementing an authenticated encryption protocol using the generated keystream.

The embodiments will now be described in detail with reference to the figures, in which any differences between the WG-16 and WG-8 embodiments are noted.

I. Linear Feedback Shift Register (LFSR)

In considering a Linear Feedback Shift Register (LFSR), let $GF(q)$ be a finite field with q elements, where q is a prime or prime power. An LFSR is a shift register whose input bit is a linear function of its previous state. Mathematically, an n-stage LFSR is defined by the following linear recursive relation over a finite field $GF(q)$: $S_{k+n}=C_0 S_k + C_1 S_{k+1} + \ldots + C_{n-1} S_{k+n-1}$, $k=0, 1, \ldots$, where $S_{k+n}$ is the output element, $C_j$ are constant coefficients, n is the number of stages, and k is an index in time. Both state variables $S_j$ and coefficients $C_j$ are elements of the finite field $GF(q)$. Besides the linear recursive relation, an LFSR can also be equivalently described by its feedback polynomial $l(x)=x^n+C_{n-1}x^{n-1}+\ldots+C_0$. To achieve efficient implementations in practice, q typically equals to 2 or $2^m$ for a positive integer m (m is larger than 2).

II. Apparatus for Implementing Stream Ciphers WG-16 and WG-8

For WG-16, the finite field $GF(2^{16})$ contains 65536 elements and is generated by an irreducible (also primitive) polynomial $p(x)=x^{16}+x^5+x^3+x^2+1$ over $GF(2)$. Each element w in $GF(2^{16})$ can be represented by a 16-bit binary vector $(w_{15}, \ldots, w_0)$, which corresponds to the polynomial $x^{16}+w_{15}x^{15}+\ldots+w_0$ in $GF(2^{16})$. The addition of two elements in $GF(2^{16})$ is simply an exclusive-or of the corresponding polynomial coefficients. The additive identity is the all-zero vector.

Furthermore, the multiplication of two elements in $GF(2^{16})$ is conducted by first multiplying the corresponding two polynomials, followed by a reduction by the irreducible polynomial $p(x)$.

Figure 1A:
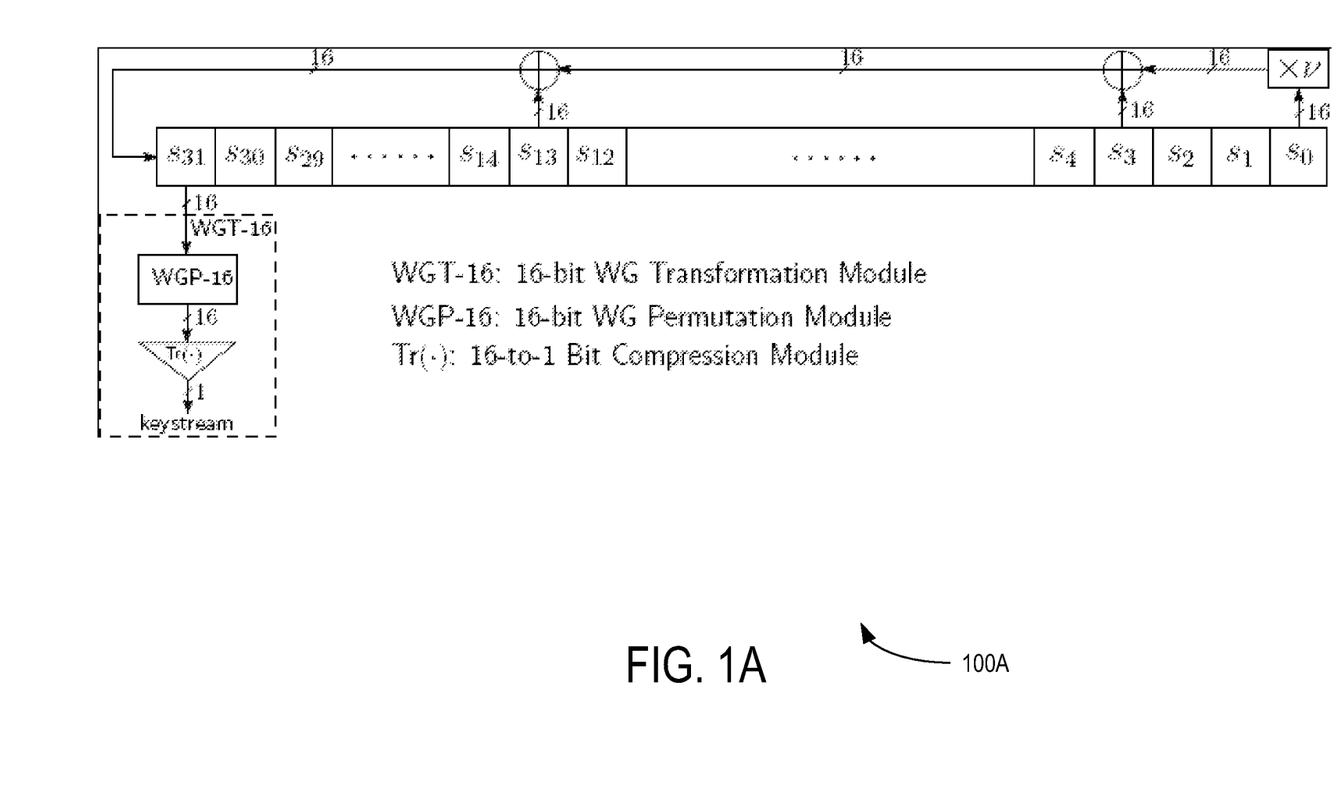
FIG. 1A shows an example implementation of the stream cipher WG-16.

FIG. 1A shows an example apparatus implementing the lightweight stream cipher WG-16. Apparatus consists of a 32-stage LFSR defined over the finite field $GF(2^{16})$ and a 16-bit nonlinear Welch-Gong (WG) transformation module. The feedback polynomial of the LFSR (which is primitive over $GF(2^{16})$) is given by $l(x)=x^{32}+x^{13}+x^3+v$, where $v=\omega^2+1$ and $p(\omega)=0$. Let $S_0, \ldots, S_{31}$ be the internal states of the LFSR. The output of the LFSR is represented by $S_{k+32}=vS_k+S_{k+3}+S_{k+13}$, $k=0, 1, \ldots$.

The 16-bit WG transformation module comprises of two sub-modules: a 16-bit WG permutation (WGP-16) module followed by a 16-to-1 bit compression module. The WGP-16 module takes input a 16-bit internal state $S_{31}$ of the LFSR and outputs another 16-bit element. Let $q(x)=x+x^{2049}+x^{2111}+x^{2113}+x^{63552}$. The WGP-16 is given by $WGP\text{-}16(x)=q(x+1)+1$. The 16-to-1 bit compression module is simply a trace computation from the finite field $GF(2^{16})$ to $GF(2)$. For an element y in $GF(2^{16})$, the trace is computed by $Tr(y)=y+y^2+y^{(2^2)}+\ldots+y^{(2^{15})}$. Therefore, the 16-bit WG transformation WGT-16 is given by $WGT\text{-}16(x)=Tr(WGP\text{-}16(x))$ for an element x in $GF(2^{16})$. The output of the 16-bit WG transformation module will be the keystream.

In practice, to achieve better security against cryptanalysis, a certain decimation d (d is coprime to $2^{16}-1$) can be applied to the original output keystream and obtain a new sequence that has the same ideal two-level autocorrelation property as the original keystream. Mathematically, for the decimation d (d is coprime to $2^{16}-1$), the output keystream is computed by $WGT\text{-}16(S_{31}^d)=Tr(WGP\text{-}16(S_{31}^d))$ for a 16-bit internal state $S_{31}$ of the LFSR.

For WG-8, the finite field $GF(2^8)$ contains 256 elements and is generated by an irreducible (also primitive) polynomial $p(x)=x^8+x^4+x^3+x^2+1$ over $GF(2)$. Each element w in $GF(2^8)$ can be represented by an 8-bit binary vector $(w_7, \ldots, w_0)$, which corresponds to the polynomial $x^8+w_7 x^7+\ldots+w_0$ in $GF(2^8)$. The addition of two elements in $GF(2^8)$ is simply an exclusive-or of the corresponding polynomial coefficients. The additive identity is the all-zero vector. Furthermore, the multiplication of two elements in $GF(2^8)$ is conducted by first multiplying the corresponding two polynomials, followed by a reduction by the irreducible polynomial $p(x)$.

Figure 1B:
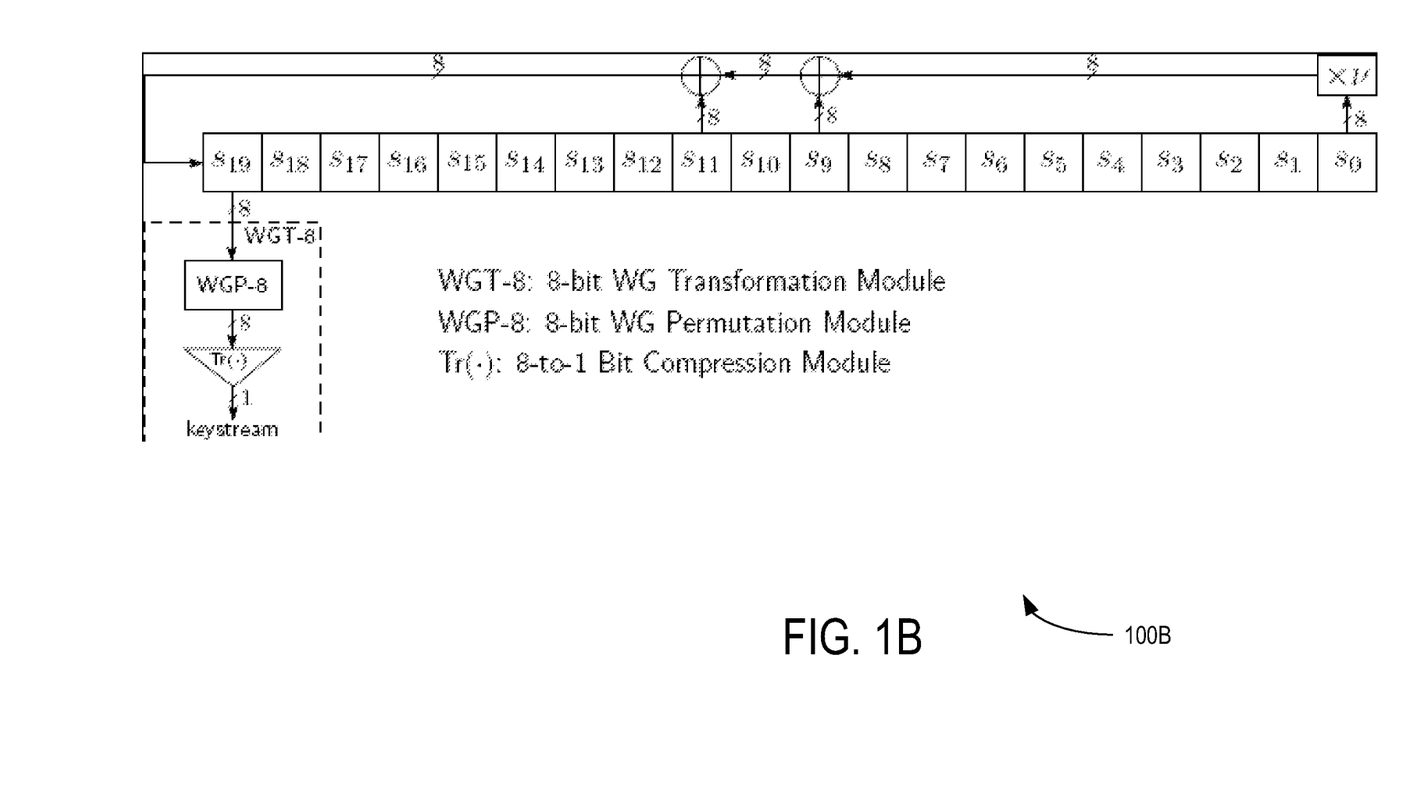
FIG. 1B shows an example implementation of the stream cipher WG-8.

FIG. 1B shows an example apparatus implementing the ultra-lightweight stream cipher WG-8. Apparatus consists of a 20-stage LFSR defined over the finite field $GF(2^8)$ and an 8-bit nonlinear Welch-Gong (WG) transformation module. The feedback polynomial of the LFSR (which is primitive over $GF(2^8)$) is given by $1(x)=x^{20}+x^{11}+x^9+v$, where $v=\omega^{38}$ and $p(\omega)=0$. Let $S_0, \ldots, S_{19}$ be the internal states of the LFSR. The output of the LFSR is represented by $S_{k+20}=vS_k+S_{k+9}+S_{k+11}$, $k=0, 1, \ldots$.

The 8-bit WG transformation module comprises of two sub-modules: an 8-bit WG permutation (WGP-8) module followed by an 8-to-1 bit compression module. The WGP-8 module takes input an 8-bit internal state $S_{19}$ of the LFSR and outputs another 8-bit element. Let $q(x)=x+x^9+x^{57}+x^{71}+x^{73}$. The WGP-8 is given by $WGP-8(x)=q(x+1)+1$. The 8-to-1 bit compression module is simply a trace computation from the finite field $GF(2^8)$ to $GF(2)$. For an element y in $GF(2^8)$, the trace is computed by $Tr(y)=y+y^2+y^{(2^2)}+\ldots+y^{(2^7)}$. Therefore, the 8-bit WG transformation WGT-8 is given by $WGT-8(x)=Tr(WGP-8(x))$ for an element x in $GF(2^8)$. The output of the 8-bit WG transformation module will be the keystream.

In practice, to achieve better security against cryptanalysis, a certain decimation d (d is coprime to $2^8-1$) can be applied to the original output keystream and obtain a new sequence that has the same ideal two-level autocorrelation property as the original keystream. Mathematically, for the decimation d (d is coprime to $2^8-1$), the output keystream is computed by $WGT-8(S_{19}^d)=Tr(WGP-8(S_{19}^d))$ for an 8-bit internal state $S_{19}$ of the LFSR.

III. Apparatus for Implementing Key/Initial Vector (IV) Initialization

Figure 2A:
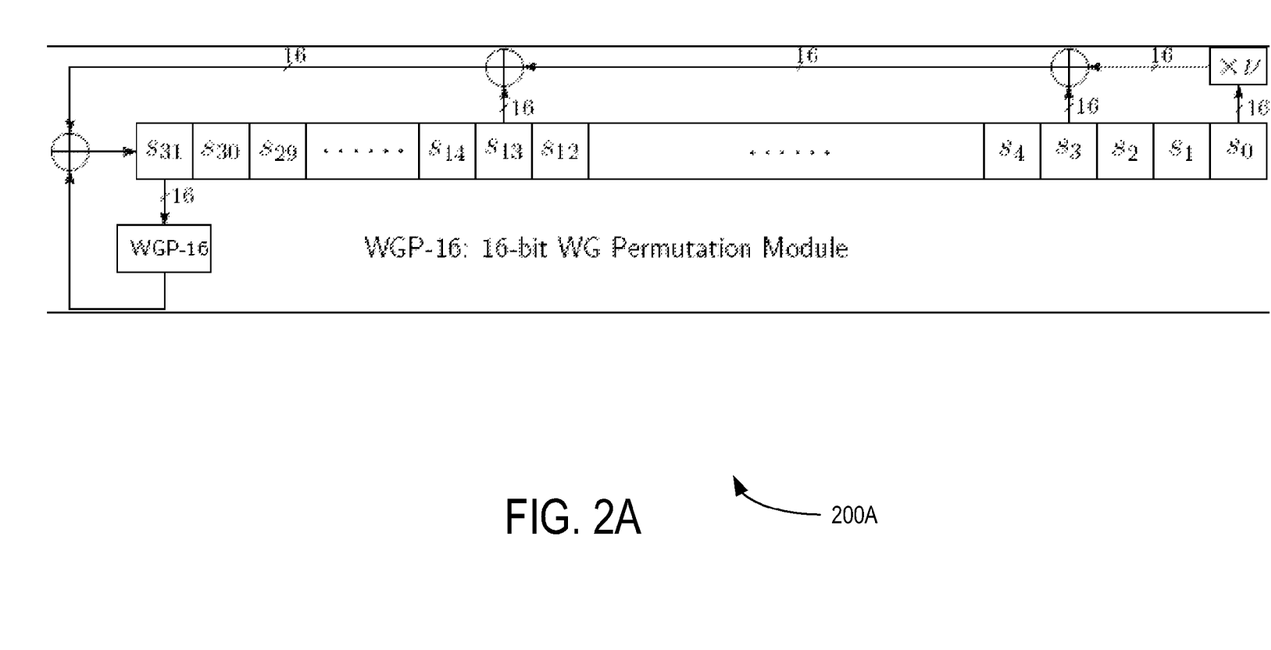
FIG. 2A shows an example implementation of key/initial vector (IV) initialization method for a the stream cipher WG-16.

FIG. 2A shows an example apparatus implementing the Key/IV initialization for the stream cipher WG-16, which shares the same apparatus as shown in FIG. 1A and only utilizes the 16-bit WG permutation (WGP-16) module. Let the 128-bit secret key and 128-bit initial vector (IV) be $k=(k_0, \ldots, k_{127})$ and $IV=(IV_0, \ldots, IV_{127})$, respectively. $S_0, \ldots, S_{31}$ be the internal states of the LFSR. The key and IV initialization process is conducted as follows: For $i=\{0, 1, \ldots, 15\}$, $S_i=(k_{8i}, \ldots, k_{8i+7}, IV_{8i}, \ldots, IV_{8i+7})$ and for $i=\{16, 17, \ldots, 31\}$, $S_i=S_{i-16}$.

Once the LFSR is loaded with the key and IV, the apparatus runs for 64 clock cycles. During each clock cycle, the 16-bit internal state $S_{31}$ passes through the nonlinear permutation WGP-16 and the output is used as the feedback to update the state of the LFSR. Therefore, the output of the LFSR can be represented by $S_{k+32}=vS_k+S_{k+3}+S_{k+13}+WGP-16(S_{k+31})$, $k=0, 1, \ldots, 63$. After the key/IV initialization process, the stream cipher WG-16 goes into the running phase and 1-bit of the keystream is generated after each clock cycle.

Figure 2B:
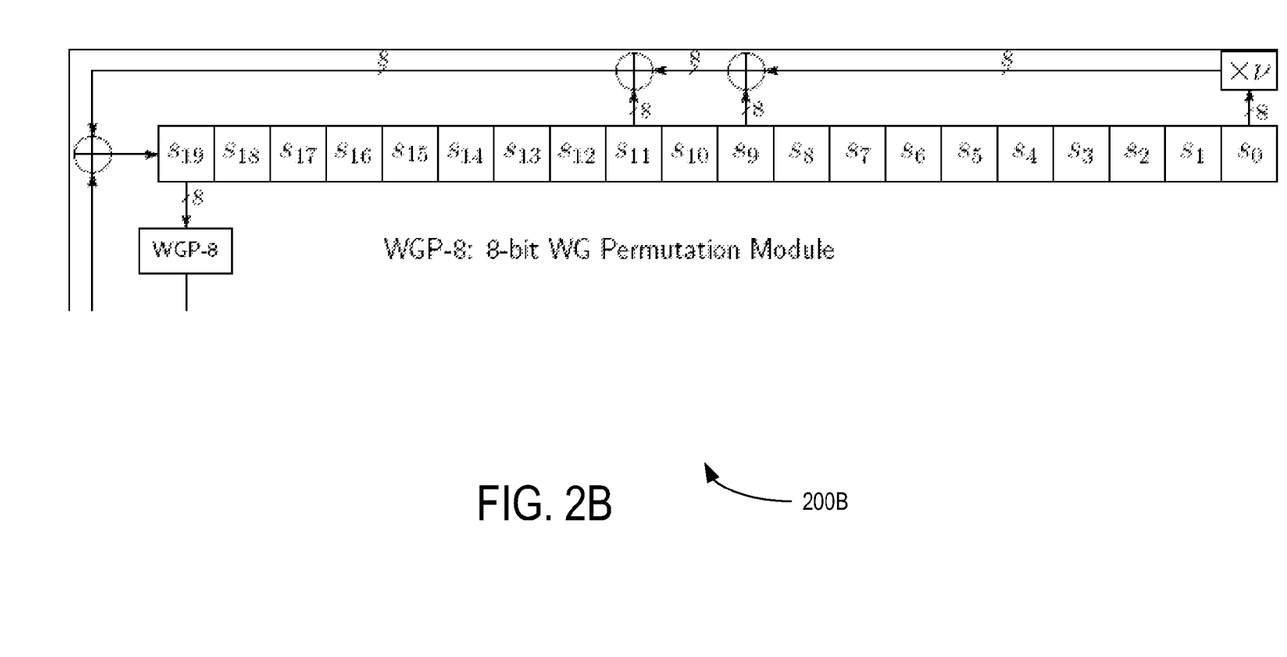
FIG. 2B shows an example implementation of key/initial vector (IV) initialization method for a the stream cipher WG-8.

FIG. 2B shows an example apparatus implementing the Key/IV initialization for the stream cipher WG-8, which shares the same apparatus as shown in FIG. 1B and only utilizes the 8-bit WG permutation (WGP-8) module. Let the 80-bit secret key and initial vector (IV) be $k=(k_0, \ldots, k_{79})$ and $IV=(IV_0, \ldots, IV_{79})$, respectively. $S_0, \ldots, S_{19}$ be the internal states of the LFSR. The key and IV initialization process is conducted as follows: For $i=\{0, 1, \ldots, 9\}$, $S_{2i}=(k_{8i}, k_{8i+1}, k_{8i+2}, k_{8i+3}, IV_{8i}, IV_{8i+1}, IV_{8i+2}, IV_{8i+3})$ and $S_{2i+1}=(k_{8i+4}, k_{8i+5}, k_{8i+6}, k_{8i+7}, IV_{8i+4}, IV_{8i+5}, IV_{8i+6}, IV_{8i+7})$.

Once the LFSR is loaded with the key and IV, the apparatus runs for 40 clock cycles. During each clock cycle, the 8-bit internal state $S_{19}$ passes through the nonlinear permutation WGP-8 and the output is used as the feedback to update the state of the LFSR. Therefore, the output of the LFSR can be represented by $S_{k+20}=vS_k+S_{k+9}+S_{k+11}+WGP-8(S_{k+19})$, $k=0, 1, \ldots, 39$. After the key/IV initialization process, the stream cipher WG-8 goes into the running phase and 1-bit of the keystream is generated after each clock cycle.

IV. Efficient Software Implementation

The stream ciphers WG-16 can be efficiently implemented on various low-power and low-cost microcontrollers. Depending on the exact resources available on the target platform, a speed-optimized version and a memory-optimized version can be implemented. For the speed-optimized implementation, two 16-bit look-up tables for WG-16 are stored in the flash memory of a microcontroller, one of which stores the results of the 16-bit WG permutation as well as the 16-bit WG transformation and the other of which keeps the results of multiplication by the constant v in $GF(2^{16})$. In this way, no any finite field operations are executed on microcontrollers and the throughput of keystream generation can be maximized.

For the memory-optimized implementation, the finite field $GF(2^{16})$ will be decomposed into a series of sub-fields and $GF(2^{16})$ is isomorphic to the tower field $GF((((2^2)^2)^2)^2)$. Based on the tower construction of $GF(2^{16})$, the 16-bit WG transformation module can be implemented using the tower field arithmetic and no any look-up tables are needed. By this means, the memory usage on the target platform can be minimized.

For WG-8, the above description for efficient software implementation also applies with all references to 16-bit changed to 8-bit, and wherein $GF(2^8)$ is isomorphic to the tower field $GF((((2^2)^2)^2)$.

Note that the above two optimization techniques denote two extreme cases where the speed or memory is the only optimization goal. A hybrid optimization technique that combines the loop-up table and the tower field arithmetic can be realized to meet the requirements in practice.

V. Efficient Hardware Implementations

The stream cipher WG-16 can also be efficiently implemented on field programmable gate arrays (FPGAs) and application-specific integrated circuits (ASICs). The cipher has three phases: load key and IV, initialize, and run. A finite state machine (FSM) controls which phase the cipher is in. The duration of each phase is determined by the number of stages in the LFSR and the latency through the 16-bit WG transformation module. The key and IV loading phase lasts 32 clock cycles, during which the input to the LFSR is the externally supplied key and IV data. The initialization phase lasts 64 clock cycles, during which the input to the LFSR is the exclusive-or of the LFSR feedback and the output from the 16-bit WG permutation (WGP-16) module. During the run phase, the input to the LFSR is just the LFSR feedback.

Depending on the trade-off among throughput, area, and power consumption, a look-up table based architecture and a Galois-field multiplier based architecture for the 16-bit WG transformation can be implemented. For a look-up table based design, the 16-bit WG permutation, the 16-bit WG transformation as well as the multiplication by the constant v in $GF(2^{16})$ can be implemented in hardware as random logic. Moreover, the registers can be used to increase the throughput. For a multiplier based design, either a polynomial basis or a normal basis can be utilized to implement the Galois-field multiplier. However, the tower field based multiplier architecture will minimize the area in hardware.

For WG-8, the above description for efficient hardware implementations also applies with all references to 16-bit changed to 8-bit, the key and IV loading phase lasts 20 clock cycles rather than 32, and the initialization phase lasts 40 clock cycles instead of 64.

Thus, the above description describes two illustrative embodiments: a lightweight stream cipher WG-16 and an ultra-lightweight stream cipher WG-8. The salient feature of the stream ciphers WG-16 or WG-8 lies in the usage of the 16-bit WG transformation or 8-bit WG transformation as a filter function for generating a cryptographically strong keystream. Using the 16-bit WG-transformation or 8-bit WG transformation guarantees that the generated keystream has good randomness properties such as periods, linear spans, auto-correlation and uniformly distributed k-bit patterns. Those randomness properties overcome the disadvantages in the previous designs. More importantly, the stream ciphers WG-16 or WG-8 can be implemented efficiently on a wide range of low-power and low-cost embedded platforms, which paves the way for widely application of the WG-16 or WG-8 in practice.

VI. Variants of the WG Stream Cipher

The WG stream cipher is a family, and other variants are possible. However, not all variants are suitable to be used in practice. The situation for an n-bit WG (i.e., WG-n), where n is the number of bits used for an n-bit WG transformation, can be summarized as follows:

When n is a multiple of 3, the WG-n transformation does not exist (e.g., WG-3, WG-6, WG-9, WG-12, WG-15, etc., do not exist).

For practical purposes, given today's advancement of hacking technologies, WG-4 based security is considered too weak for most applications. WG-5 based security is also considered weak, but WG-5 can be combined with nonlinear feedback shift registers to construct lightweight pseudorandom number generators which may provide sufficient strength for certain applications.

WG-7 based security is likely sufficient for passive RFID applications, and is suitable for hardware implementation or speed-optimized software implementation.

WG-8 based security, as detailed above, is sufficient for passive RFID applications, and is suitable for hardware implementation and speed-optimized software implementation. Additionally, WG-8, (where $8=2^3$), is suitable for a memory-optimized implementation using the tower field computation technique as described above. Based on this memory-optimized implementation, WG-8 is considered to be particularly efficient for the smart device applications as described above.

WG-10 and WG-11 based security is enough for lightweight applications, but these ciphers are considered to be suitable only for hardware implementation, as the memory cost for software implementation may be too high.

WG-13 and WG-14 based security is enough for lightweight applications. However, these ciphers provide challenges for both software and hardware implementations.

WG-16 based security is high for lightweight applications, and is suitable for both hardware and software implementations. Additionally, WG-16, (where $8=2^4$), is suitable the tower field computation technique as detailed above.

Similarly, WG-32 based security is considered very high for general purpose applications, although it's use may become more commonplace as computational power of mobile devices and smart devices continue to grow. WG-32, (where $8=2^5$), can be implemented in hardware and software, and is also suitable for a memory-optimized implementation using the tower field computation technique as described above.

In summary, WG-8, WG-16, WG-32, WG-64, etc. are the most efficient variants for using the tower field technique. Noting that for WG-n with $n=2^k$ for an integer k, the finite field $GF(2^{(2^k)})$ can be decomposed into the equivalent tower field $GF(((((2^2)^2) \ldots )^2)$. Here, tower structure means that we construct $GF(2^{(2^k)})$ from $GF(2^{(2^{k-1})})$, then construct $GF(2^{(2^{k-1})})$ from $GF(2^{(2^{k-2})}), \ldots$, and finally construct $GF(2^2)$ from $GF(2)$. As a result, all the computations in $GF(2^{(2^k)})$ can be sequentially reduced to the computations in subfields $GF(2^{(2^{k-1})}), GF(2^{(2^{k-2})}), \ldots$, and $GF(2)$ (i.e., a complicated operation is broke into a series of simple operations). Therefore, the tower field technique efficiently improves the performance and memory/area cost for software and hardware implementations. For WG-n and n being a prime number, the tower field technique is not applicable (e.g., in the case of WG-7, the only subfield for $GF(2^7)$ is $GF(2)$ and therefore the operation in $GF(2^7)$ cannot be simplified. For n being a composite number, the tower field technique is applicable (e.g., in the case of WG-10, we can construct $GF(2^{10})$ from $GF(2^5)$, and then construct $GF(2^5)$ from $GF(2)$). However, these WG variants cannot be implemented as efficient as the WG-8, WG-16, WG-32, WG-64, etc.

More generally speaking, for each WG-n variant, parameters may be selected to suit a particular application or to substantially match the performance characteristics of competing cryptographic systems. Thus, for example, the secret key may be s-bits long, the initial vector may be t-bits long, the LFSR may be a u-stage LFSR, and the initial clock cycle may be v clock cycles, where s, t, u and v are selected to match a required security level for a given application.

VII. Illustrative Software Implementations of WG Stream Ciphers

The following are illustrative examples for software implementations of WG stream ciphers.

For implementing stream ciphers WG-8 and WG-16 on software platforms efficiently, the inventors have developed different implementation strategies for three main components (i.e., multiplication by constant module, a WG permutation module, and a WG transformation module) below, which make tradeoffs between speed and memory consumption.

A. Implementation of Multiplication by Constant Module:

This module can be implemented by the following two methods:

i) Direct look-up table mode: One 8×8 (resp. 16×16) look-up table is utilized to store the results of multiplication by constant in WG-8 (resp. WG-16).
ii) Logic operation mode: The multiplication by constant is implemented by using simple logic operations (i.e., AND, XOR, and Shift), without storing any look-up tables.

Figure 3:
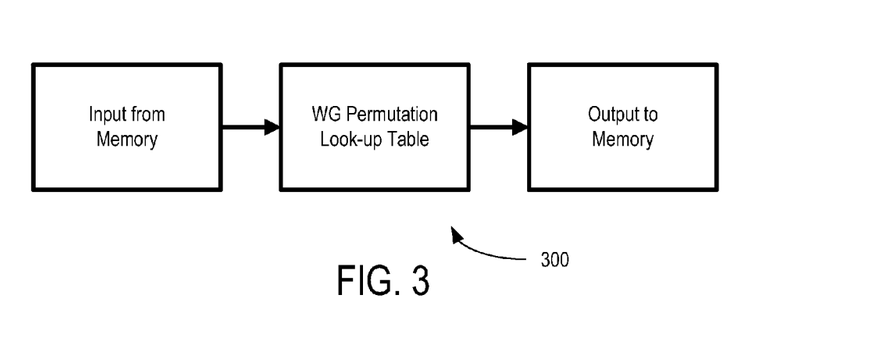
FIG. 3 shows an example implementation of WG permutation using a direct look-up table mode.
Figure 4:
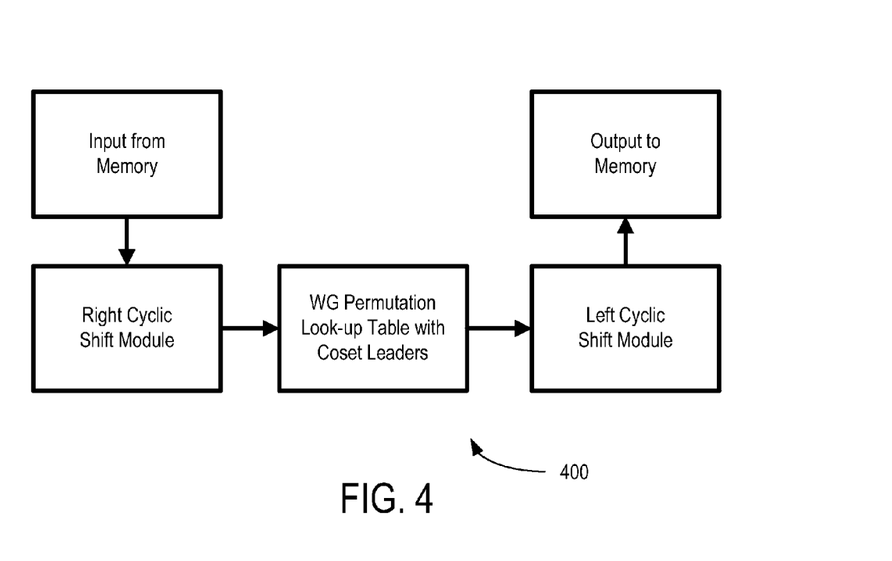
FIG. 4 shows an example implementation of WG permutation using a coset leader mode.
Figure 5:
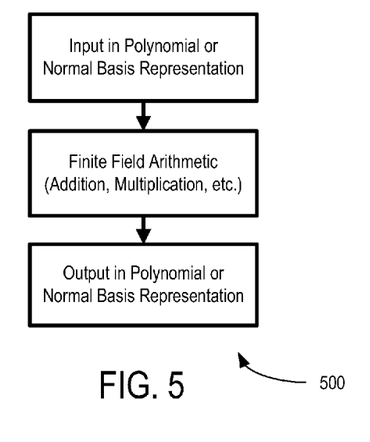
FIG. 5 shows an example implementation using a direct field arithmetic mode.
Figure 6:
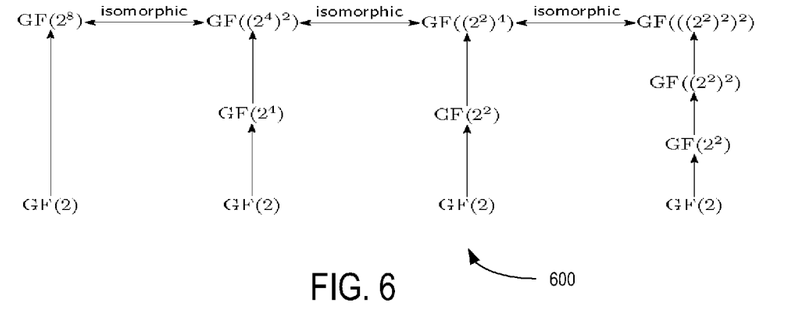
FIG. 6 shows a finite field and its three isomorphic tower fields.
Figure 7:
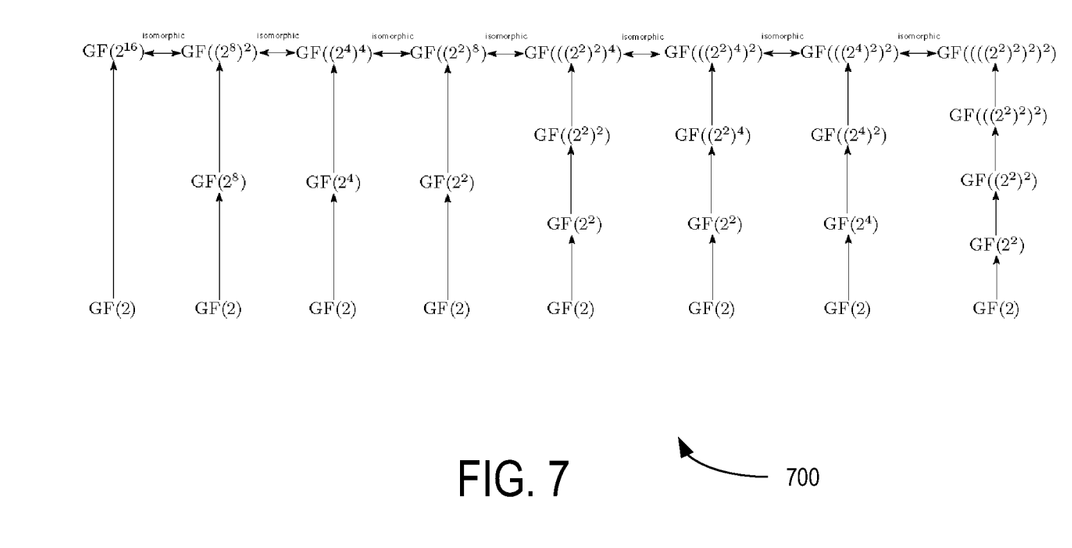
FIG. 7 shows a finite field and its seven isomorphic tower fields.

B. Implementation of WG Permutation Module:

This module can be implemented by the following four methods:

i) Direct look-up table mode: One 8×8 (resp. 16×16) look-up table is utilized to store the results of WG permutation for all finite fields elements in WG-8 (resp. WG-16). The workflow of this method is illustrated in FIG. 3.
ii) Coset leader look-up table mode: Instead of storing the results of WG permutation for all finite field elements in WG-8 (resp. WG-16), only WG permutation results for the coset leaders of finite field $GF(2^8)$ (resp. $GF(2^{16})$) are pre-computed and stored. In this way, the required flash memory for computing WG permutation is reduced significantly. The workflow of this method is illustrated in FIG. 4.
iii) Direct field arithmetic mode: For stream ciphers WG-8 and WG-16, this method directly computes the WG permutation over finite fields $GF(2^8)$ and $GF(2^{16})$ with either a polynomial or a normal basis representation for finite field elements. The workflow of this method is illustrated in FIG. 5.
iv) Tower field arithmetic mode: This method provides a flexible way to achieve tradeoffs between speed and memory consumption. For stream ciphers WG-8 and WG-16, the underlying finite fields $GF(2^8)$ and $GF(2^{16})$ can be decomposed into isomorphic tower fields as shown in FIG. 6 and FIG. 7.

Figure 8:
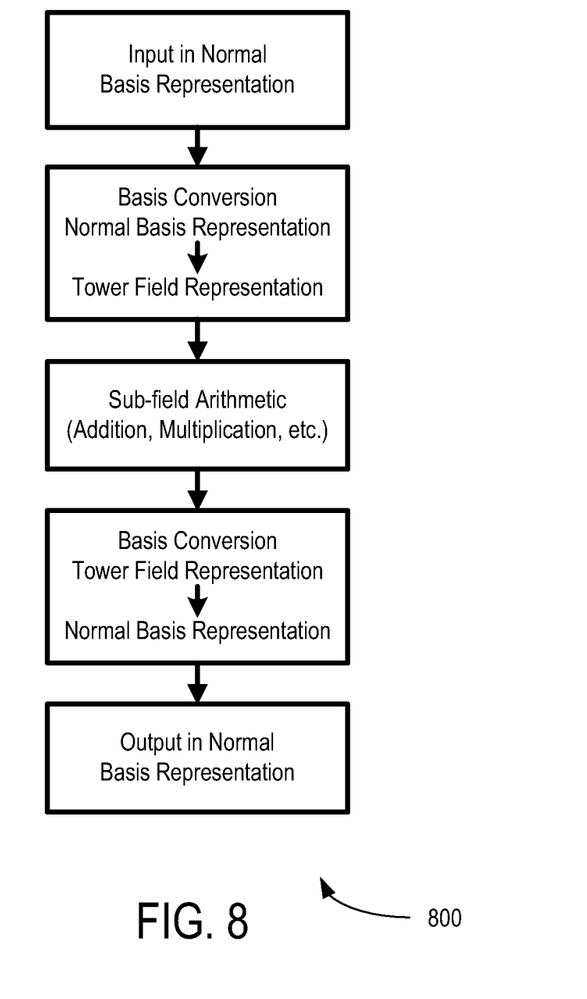
FIG. 8 shows an example implementation of WG permutation using a tower field arithmetic mode.

With the tower field representation, the WG permutation can be computed using the simple sub-field arithmetic and/or small look-up tables instead of the expensive operations in original finite fields $GF(2^8)$ and $GF(2^{16})$. The workflow of using the tower field based approach to calculate WG permutation is illustrated in FIG. 8.

C. Implementation of WG Transformation Module:

This module can be implemented by the following two methods:

i) Direct Look-up table mode: One 8×1 (resp. 16×1) look-up table is pre-computed to store the results of WG transformation for all finite fields elements in WG-8 (resp. WG-16).
ii) Logic operation mode: The output of the WG permutation will be re-used to compute the WG transformation. If finite field elements are represented with normal basis, the WG transformation is calculated by XORing all bits of the WG permutation result. Otherwise, if a polynomial basis is used, XORing some bits of the output of the WG permutation gives the result of the WG transformation. Those bits are selected by the corresponding basis elements whose traces are equal to 1.

VIII. Illustrative Hardware Implementations of WG Stream Ciphers

The following are illustrative examples of hardware implementations of WG stream ciphers.

Figure 9:
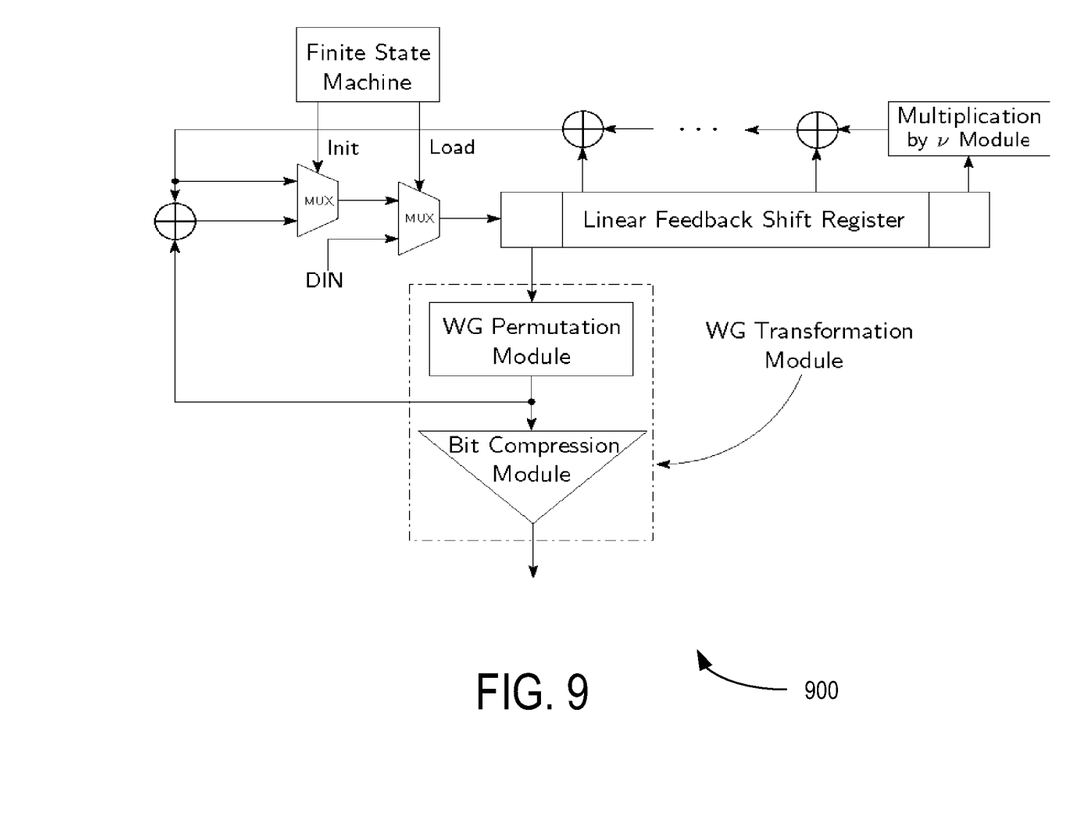
FIG. 9 shows an illustrative example hardware architecture of a stream cipher WG core.

For implementing stream ciphers WG-8 and WG-16 in hardware (e.g., FPGA and ASIC) efficiently, we consider different hardware optimization techniques for three main components (i.e., multiplication by constant module, WG permutation module, and WG transformation module) below, which make tradeoffs between speed and area. A high-level architecture of the stream cipher WG is depicted in FIG. 9, where the WG core conducts the initialization phase and running phase under the control of a finite state machine.

A. Implementation of Multiplication by Constant Module:

i) Direct look-up table mode: One 8×8 (resp. 16×16) look-up table is implemented by random logic or a ROM for the multiplication by constant in WG-8 (resp. WG-16).
ii) Logic operation mode: The multiplication by constant is implemented by using a plurality of XOR operations in WG-8 and WG-16.

For both approaches, a plurality of registers can be used to reduce the delay of a critical path.

B. Implementation of WG Permutation Module:

i) Direct look-up table mode: One 8×8 (resp. 16×16) look-up table is implemented by random logic or a ROM for the WG permutation in WG-8 (resp. WG-16).
ii) Coset leader look-up table mode: A coset leader look-up table is implemented by random logic or a ROM for the WG permutation in WG-8 (resp. WG-16).
iii) Direct field arithmetic mode: a finite field multiplier needs to be implemented in hardware for computing the WG permutation. The multiplier can be built using either a polynomial basis or a normal basis. A basis conversion unit might be required to convert a finite field element between a polynomial basis representation and a normal basis representation.
iv) Tower field arithmetic mode: two basis conversion units are implemented to convert a finite field element between a normal basis representation and a tower field representation. Based on the tower field representation, a full finite field multiplier over $GF(2^8)$ and $GF(2^{16})$ can be broken down to a series of sub-field multipliers, which can be efficiently implemented in hardware with simple logic operations (i.e., AND, XOR, etc.) over sub-fields. Moreover, the sub-field operations can also be implemented by small look-up tables in hardware as random logic or a ROM. For example, for finite field $GF(2^{16})$, an 8×8, 4×4, or 2×2 look-up table can be used to implement the sub-field operations. For finite field $GF(2^8)$, a 4×4 or 2×2 look-up table can be used to implement the sub-field operations.

For both direct field arithmetic mode and the tower field arithmetic mode, a plurality of registers can be inserted between different arithmetic units to obtain pipeline or superpipeline based hardware architectures, which can increase the throughput of the resulting WG core significantly at the expense of increased area.

C. Implementation of WG Transformation Module:

For efficient hardware implementation, the WG transformation module will reuse the design of the above WG permutation module. Based on the selection of basis for finite fields, a plurality of XOR gates are required to implement the WG transformation in hardware. Finite field elements are represented with normal basis, and the WG transformation module is comprised of the WG transformation module followed by an n-bit XOR gate, where n is 8 or 16 for WG-8 and WG-16, respectively. If other basis is used to represent finite field elements, the WG transformation module consists of the WG transformation module followed by an m-bit XOR gate, where m is less than 8 or 16 for WG-8 and WG-16, respectively.

Figure 10:
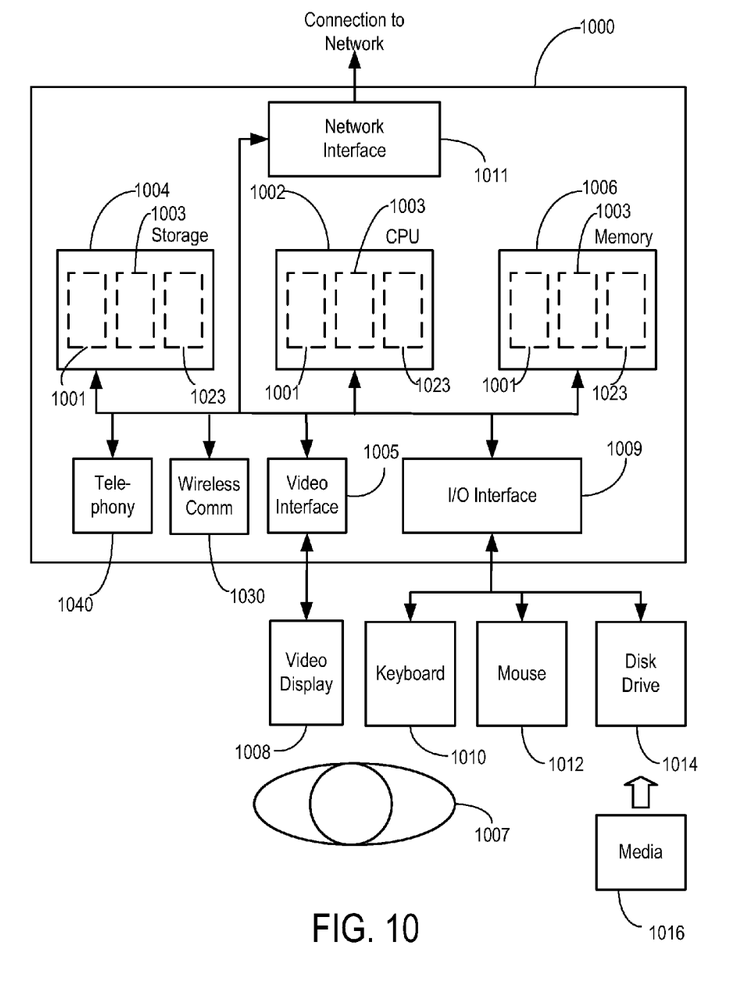
FIG. 10 is a schematic block diagram of a generic computer device which may provide a suitable operating environment for various embodiments.

A suitably configured computer device, and associated communications networks, devices, software and firmware may provide a platform for enabling one or more embodiments as described above. By way of example, FIG. 10 shows a generic computer device 1000 that may include a central processing unit ("CPU") 1002 connected to a storage unit 1004 and to a random access memory 1006. The CPU 1002 may process an operating system 1001, application program 1003, and data 1023. The operating system 1001, application program 1003, and data 1023 may be stored in storage unit 304 and loaded into memory 1006, as may be required. Computer device 1000 may further include a graphics processing unit (GPU) 1022 which is operatively connected to CPU 1002 and to memory 1006 to offload intensive image processing calculations from CPU 1002 and run these calculations in parallel with CPU 1002. An operator 1007 may interact with the computer device 1000 using a video display 1008 connected by a video interface 1005, and various input/output devices such as a keyboard 1010, mouse 1012, and disk drive or solid state drive 1014 connected by an I/O interface 1009. In known manner, the mouse 1012 may be configured to control movement of a cursor in the video display 1008, and to operate various graphical user interface (GUI) controls appearing in the video display 1008 with a mouse button. The disk drive or solid state drive 1014 may be configured to accept computer readable media 1016. The computer device 1000 may form part of a network via a network interface 1011, allowing the computer device 1000 to communicate with other suitably configured data processing systems (not shown).

The systems and methods in accordance with various embodiments of the present invention may be practiced on virtually any manner of computer device including a desktop computer, laptop computer, tablet computer or wireless handheld, and certain embodiment may also be embodied in extremely resource limited devices such as passive smart devices.

The present system and method may also be implemented as a computer-readable/useable medium that includes computer program code to enable one or more computer devices or passive smart devices to implement each of the various process steps in a method in accordance with the present invention. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system. The examples described herein are provided merely to exemplify possible embodiments, and a skilled reader will recognize that variations of the embodiments described herein may also be practiced without departing from the scope of the present invention. Various embodiments may be implemented on both software and hardware platforms as described above.

Thus, in an aspect, there is provided a computer-implemented method for generating a linear cryptographic keystream on a device, comprising: i) loading a secret key and an initial vector (IV) into a linear feedback shift register (LFSR); ii) running the LFSR for an initial clock cycle with a nonlinear permutation feedback Welch-Gong n-bit (WG-n) transformation module as a filtering function; and iii) outputting a 1-bit keystream from the WG-n transformation module for each clock cycle after the initial clock cycle.

In an embodiment, n is selected from $2^k$, where k is an integer, such that a finite field (Galois-field) $GF(2^{(2^k)})$ can be decomposed into an equivalent tower field $GF(((((2^2)^2)\ldots)^2)$, thereby allowing a memory-optimized implementation of the WG-n transformation utilizing the equivalent tower field.

In another embodiment, the secret key is s-bits long, the initial vector is t-bits long, the LFSR is a u-stage LFSR, and the initial clock cycle is v clock cycles, where s, t, u and v are selected to match a required security level for a given application.

In another embodiment, the method further comprises utilizing an n×n look-up table to store the results of multiplication by a constant in WG-n.

In another embodiment, the method further comprises implementing logic operations including AND, XOR, and Shift.

In another embodiment, the method further comprises utilizing a look-up table to store the results of WG permutation for all finite field elements in WG-n.

In another embodiment, the method further comprises computing and storing WG permutation results for only coset leaders of finite field $GF(2^n)$.

In another embodiment, the method further comprises directly computing the WG permutation over finite fields $GF(2^n)$ with either a polynomial or a normal basis representation for finite field elements.

In another embodiment, the method further comprises computing the WG permutation utilizing one or more of simple sub-field arithmetic and look-up tables.

In another embodiment, the method further comprises precomputing an n×1 look-up table to store the results of WG transformation for all finite field elements in WG-n.

In another embodiment, the method further comprises, if finite field elements are represented with normal basis, calculating a WG transformation by XORing all bits of the WG permutation result; otherwise, if a polynomial basis is used, XORing some bits of the output of the WG permutation selected by the corresponding basis elements whose traces are equal to 1 to give the result of the WG transformation.

In another embodiment, there is provided an apparatus for generating a linear cryptographic keystream on a device, comprising: a linear feedback shift register (LFSR) for loading therein a secret key and an initial vector (IV); and a nonlinear permutation feedback Welch-Gong n-bit (WG-n) transformation module for running the LFSR for an initial clock cycle with a filtering function, and outputting a 1-bit keystream for each clock cycle after the initial clock cycle.

In another embodiment, n is selected from $2^k$, where k is an integer, such that a finite field (Galois-field) $GF(2^{(2^k)})$ can be decomposed into an equivalent tower field $GF(((((2^2)^2)\ldots)^2)$, thereby allowing a memory-optimized implementation of the WG-n transformation utilizing the equivalent tower field.

In another embodiment, the secret key is s-bits long, the initial vector is t-bits long, the LFSR is a u-stage LFSR, and the initial clock cycle is v clock cycles, where s, t, u and v are selected to match a required security level for a given application.

In another embodiment, the apparatus further comprises an n×n look-up table implemented in a logic circuit by random logic or a ROM for the multiplication by constant in WG-n.

In another embodiment, the apparatus further comprises a multiplication by constant function implemented in a logic circuit utilizing XOR operation circuits in WG-n.

In another embodiment, the apparatus further comprises an n×n look-up table implemented in a logic circuit by random logic or a ROM for the WG permutation in WG-8 (resp. WG-16).

In another embodiment, the apparatus further comprises a coset leader look-up table implemented in a logic circuit by random logic or a ROM for a WG permutation in WG-n.

In another embodiment, the apparatus is adapted to operate in a direct field arithmetic mode, and includes a finite field multiplier implemented in a logic circuit for computing a WG permutation in WG-n, the multiplier is built using either a polynomial basis or a normal basis.

In another embodiment, the apparatus is adapted to operate in a tower field arithmetic mode to convert a finite field element between a normal basis representation and a tower field representation, and includes a full finite field multiplier over GF(2.sup.n) implemented in a logic circuit as simple logic operations over sub-fields, and the sub-field operations are implemented by look-up tables in random logic or a ROM.

In another embodiment, the apparatus further includes a WG transformation module implemented in a logic circuit.

It should be noted that while the foregoing written description of the invention are merely examples and are not be constructed as limiting the invention. The description of the embodiments is intended to be illustrative and the skilled person will be aware of many further potential modifications and adaptations that fall within the scope of the claimed invention and its equivalents. The invention should therefore not be limited by the above described embodiment, method, and examples, but by all embodiments and methods within the scope and spirit of the invention as claimed.

The invention claimed is:

1. A method executable on a processing device having a processor and a memory for generating a linear cryptographic keystream on the processing device, comprising:
   i) performing by the processor loading a secret key and an initial vector (IV) into a linear feedback shift register (LFSR);
   ii) performing by the processor running the LFSR for an initial clock cycle with a nonlinear feedback Welch-Gong n-bit (WG-n) transformation module as a filtering function, wherein a Welch-Gong (WG) transformation comprises a Welch-Gong (WG) permutation and trace function, and wherein n is equal to 2.sup.k, and wherein n and k are positive integers, such that a finite field (Galois-field) GF(2.sup.(2.sup.k)) can be decomposed into an equivalent tower field representation GF((((2.sup.2).sup.2) . . . ).sup.2); and
   iii) outputting a 1-bit keystream from the WG-n transformation module for each clock cycle after the initial clock cycle;
   thereby performing a memory-optimized implementation of a Welch-Gong (WG) transformation utilizing a stream cipher equivalent tower field representation.

2. The method of claim 1, wherein the secret key is s-bits long, the initial vector is t-bits long, the LFSR is a u-stage LFSR, and the initial clock cycle is v clock cycles, where s, t, u and v are positive integers, and selected to match a required security level for a given application.

3. The method of claim 1, further comprising utilizing an n.times.n look-up table to store the results of multiplication by a constant in the WG-n transformation module based on an equivalent tower field representation of field elements.

4. The method of claim 1, further comprising implementing logic operations including AND, XOR, and Shift based on an equivalent tower field representation of field elements.

5. The method of claim 1, further comprising utilizing a look-up table to store the Welch-Gong (WG) permutation results for all finite field elements in the WG-n transformation module based on an equivalent tower field representation of field elements.

6. The method of claim 1, further comprising computing and storing Welch-Gong (WG) permutation results for only coset leaders of finite field GF(2.sup.n).

7. The method of claim 1, further comprising directly executing the Welch-Gong (WG) permutation over finite fields GF(2.sup.n) with a tower field representation of field elements.

8. The method of claim 1, further comprising computing the Welch-Gong (WG) permutation by applying finite field arithmetic at an upper layer of a tower field representation and sub-field look-up tables at a lower layer of the tower field representation.

9. The method of claim 1, further comprising pre-computing an n.times.1 look-up table to store the results of the Welch-Gong (WG) transformation for all finite fields elements in the Welch-Gong (WG) transformation based on an equivalent tower field representation of field elements.

10. The method of claim 1, further comprising XORing some bits of the output of the Welch-Gong (WG) permutation selected by the corresponding basis elements whose traces are equal to 1 to give the result of the a Welch-Gong (WG) transformation.

11. A processing device having a processor and a memory for generating a linear cryptographic keystream on the processing device, comprising:
   a linear feedback shift register (LFSR) logic circuit loading therein a secret key and an initial vector (IV); and
   a nonlinear feedback Welch-Gong n-bit (WG-n) transformation logic module running the LFSR for an initial clock cycle with a filtering function, wherein a Welch-Gong (WG) transformation comprises a Welch-Gong (WG) permutation and trace function, and wherein n is equal to 2.sup.k, and wherein n and k are positive integers, such that a finite field (Galois-field) GF(2.sup.(2.sup.k)) can be decomposed into an equivalent tower field representation GF((((2.sup.2).sup.2) . . . ).sup.2); and
   outputting a 1-bit keystream for each clock cycle after the initial clock cycle;
   thereby performing a memory-optimized implementation of a Welch-Gong (WG) transformation utilizing a stream cipher equivalent tower field representation.

12. The processing device of claim 11, wherein the secret key is s-bits long, the initial vector is t-bits long, the LFSR is a u-stage LFSR, and the initial clock cycle is v clock cycles, where s, t, u and v are positive integers, and selected to match a required security level for a given application.

13. The processing device of claim 11, further comprising a n.times.n look-up table implemented in a logic circuit by random logic or a ROM for the multiplication by constant in the WG-n transformation logic module based on an equivalent tower field representation of field elements.

14. The processing device of claim 11, further comprising a multiplication by constant function implemented in a logic circuit utilizing XOR operation circuits in the WG-n transformation logic module based on an equivalent tower field representation of field elements.

15. The processing device of claim 11, further comprising an n.times.n look-up table implemented in a logic circuit by random logic or a ROM for the Welch-Gong (WG) permutation in WG-8 bit or WG-16 bit based on an equivalent tower field representation of field elements.

16. The processing device of claim 11, further comprising a coset leader look-up table implemented in a logic circuit by random logic or a ROM for the Welch-Gong (WG) permutation based on an equivalent tower field representation of field elements.

17. The processing device of claim 11, wherein the processing device is adapted to operate in a direct field arithmetic mode, and includes a finite field multiplier implemented in a logic circuit for computing the Welch-Gong (WG) permutation, wherein the multiplier is built using an equivalent tower field representation of field elements.

18. The processing device of claim 11, wherein the processing device is adapted to operate in a tower field arithmetic mode to convert a finite field element between a normal basis representation and a tower field representation, and includes a full finite field multiplier over the Galois-field GF(2.sup.n) implemented in a logic circuit as simple logic operations over sub-fields, and the sub-field operations are implemented by look-up tables based on an equivalent tower field representation in random logic or a ROM.

19. The processing device of claim 11, wherein the processing device further includes a WG-n transformation logic module implemented in a logic circuit based on an equivalent tower field representation of field elements.

* * * * *